May 7, 1940. M. A. WATERS Re. 21,445

BOX-FORMING MACHINE

Original Filed June 22, 1935 4 Sheets-Sheet 1

Inventor:
Marshall A. Waters.
By Young & Young
Attorneys

May 7, 1940. M. A. WATERS Re. 21,445

BOX-FORMING MACHINE

Original Filed June 22, 1935 4 Sheets-Sheet 2

Inventor

Marshall A. Waters.

By

Attorneys

May 7, 1940. M. A. WATERS Re. 21,445
BOX-FORMING MACHINE
Original Filed June 22, 1935 4 Sheets-Sheet 3
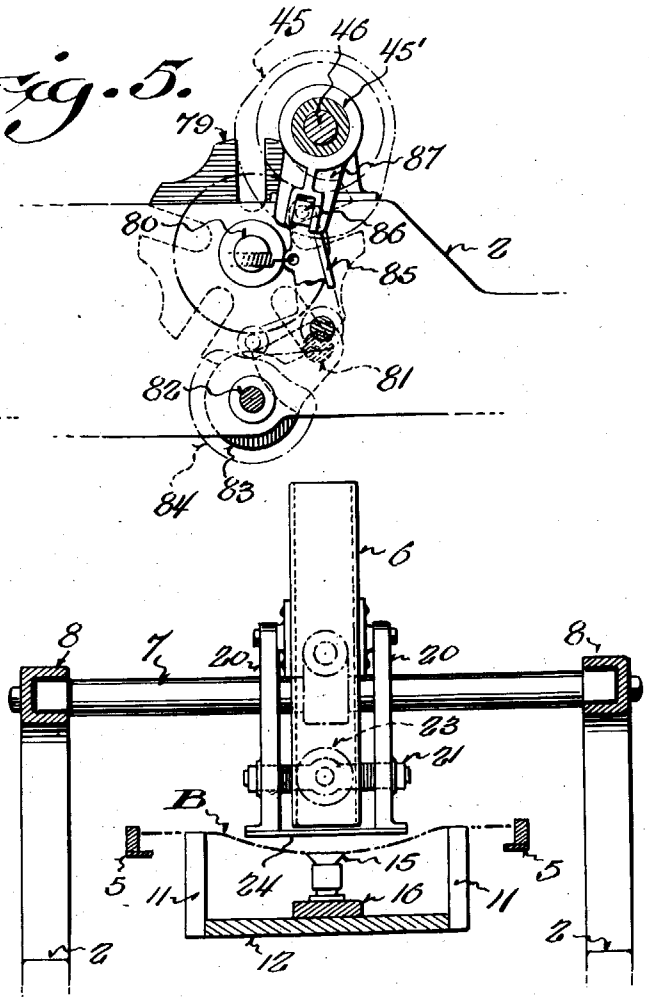
Fig. 5.
Fig. 6.
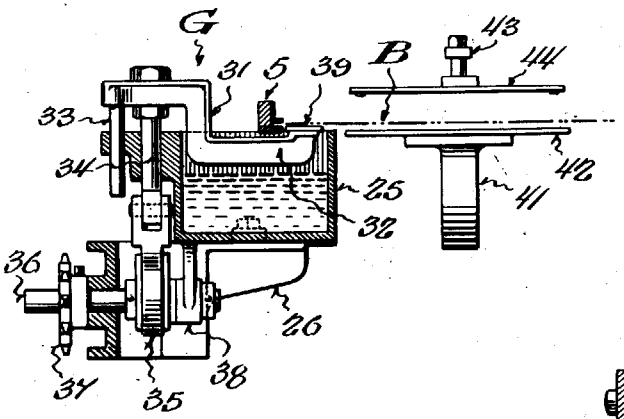
Fig. 4.
Inventor
Marshall A. Waters.
By [illegible]
Attorneys.

BOX-FORMING MACHINE

Original Filed June 22, 1935 4 Sheets-Sheet 4

Inventor:

Marshall A. Waters

By

Attorneys

Reissued May 7, 1940

Re. 21,445

UNITED STATES PATENT OFFICE 21,445

BOX-FORMING MACHINE

Marshall A. Waters, River Forest, Ill., assignor to Mary R. Claff and C. Lloyd Claff, trustees Original No. 2,077,913, dated April 20, 1937, Serial No. 27,876, June 22, 1935. Application for reissue April 18, 1939, Serial No. 268,637

16 Claims. (Cl. 93—44.1)

The present invention relates to box-forming machines, and more particularly to machines for folding and securing the sides of a paper box blank together.

The invention has primarily for its object to provide a comparatively simple, inexpensive, and efficient machine of maximum capacity, in which the gluing and various folding operations are automatically and progressively performed as the blank is carried through the machine.

Incidental to the foregoing, a more specific object of the invention is to provide a machine in which the blanks are delivered to a rotary carrier, that conveys them through tucking, folding, and clamping mechanisms, which automatically complete the forming of the boxes that are then discharged from the carrier.

A further object resides in the provision of highly novel means for selecting and feeding the blanks in the forming mechanisms, including suction means for separating the lowermost blank from the stack, whereby the same is delivered to the feeding mechanism.

Another object is to provide a novel form of gluing mechanism for applying adhesive to portions of the blanks.

A still further object resides in the provision of rotary grippers for effecting final adherence of the blanks upon completion of the forming operations.

It is also an object of the invention to provide novel means for discharging the completed boxes from the carrier, including shifting of the gripping control means to quickly release and discharge the boxes.

Lastly, it is an object to provide for adjustment of the gluing and forming mechanisms to accommodate blanks of different characteristics and dimensions.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

Figure 1:
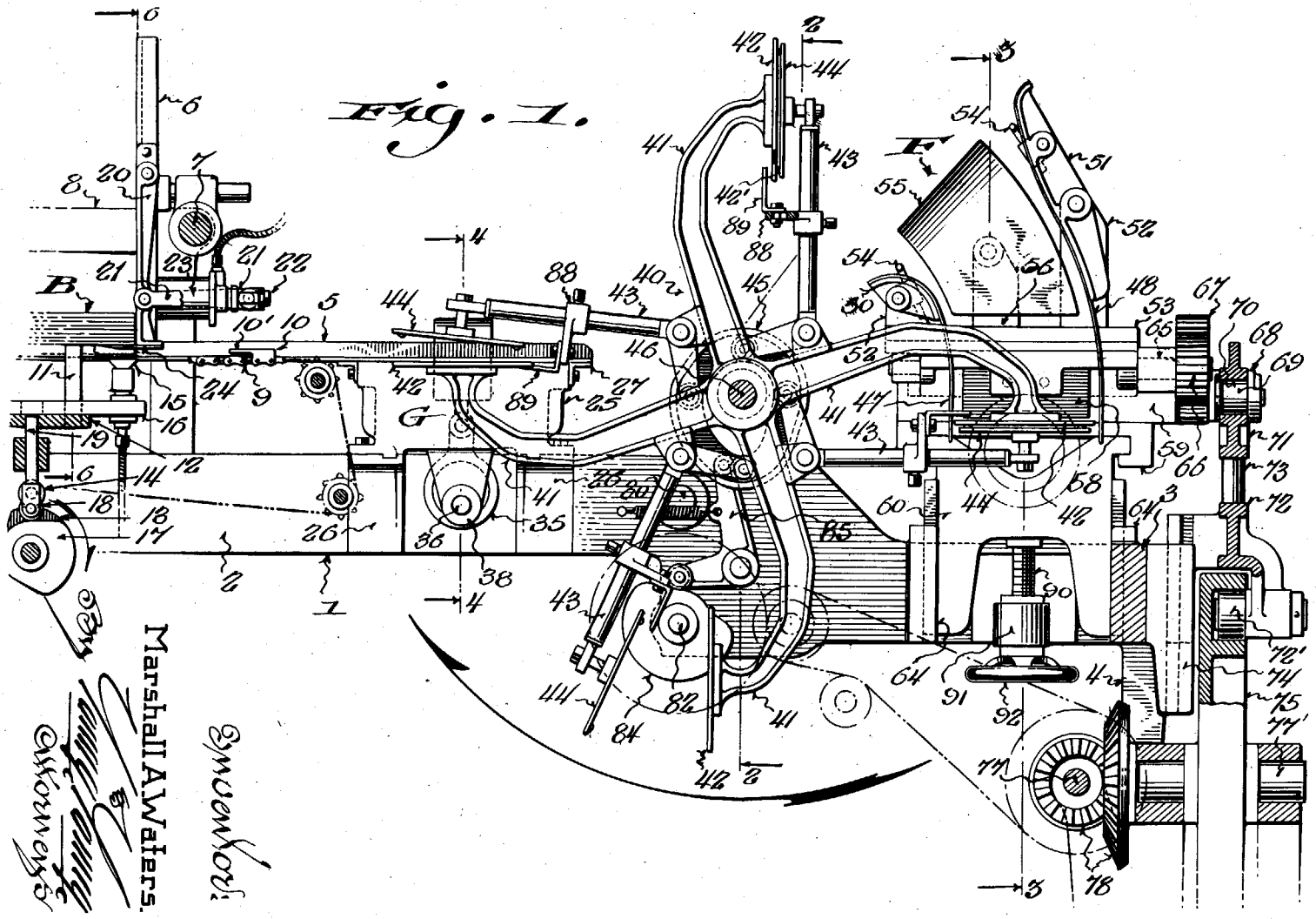
Figure 5:
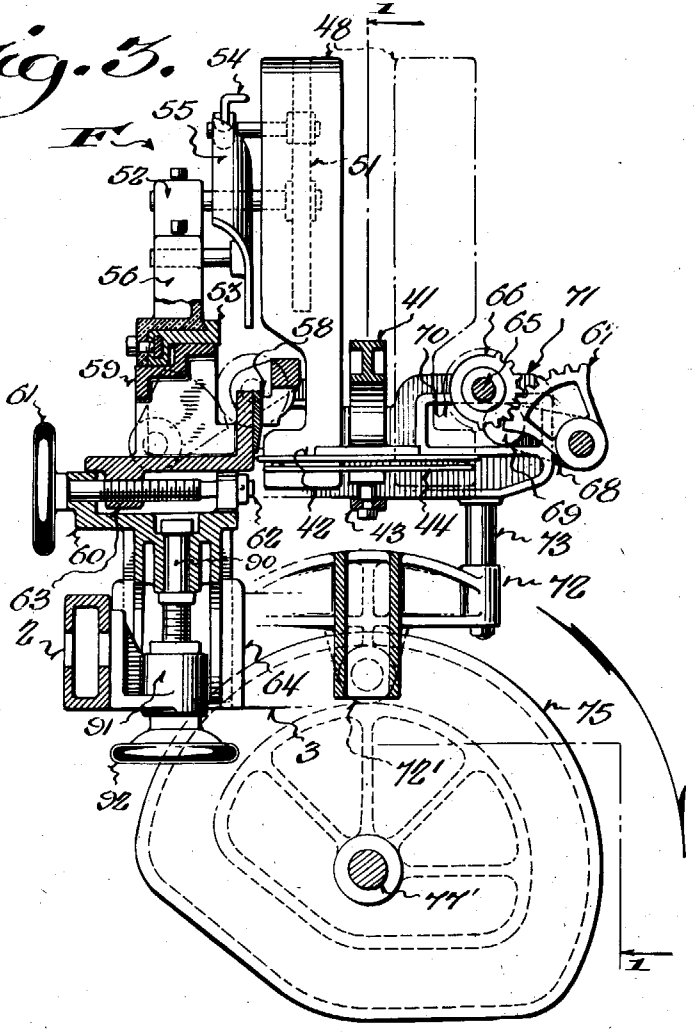
Figure 2:
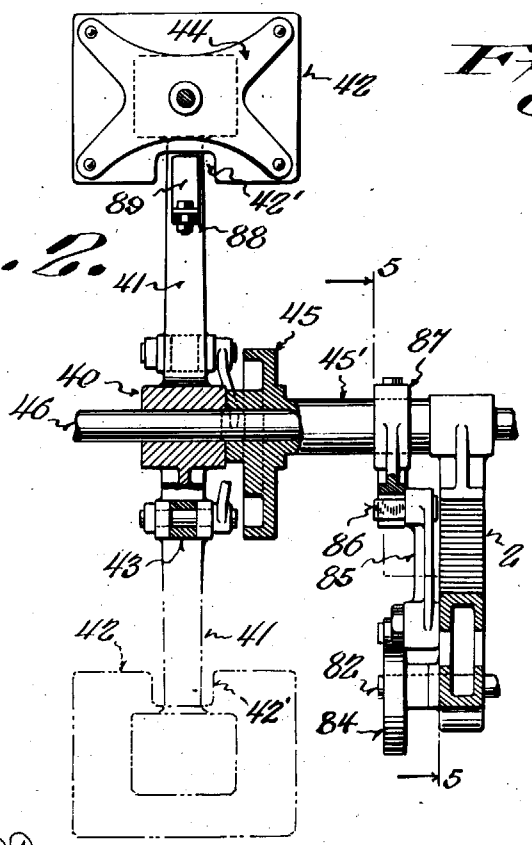
Figure 7:
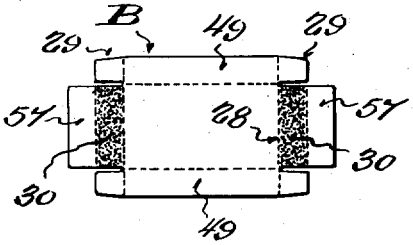
Figure 9:
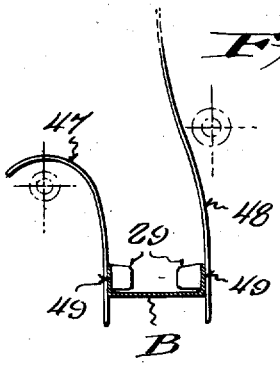
Figure 8:
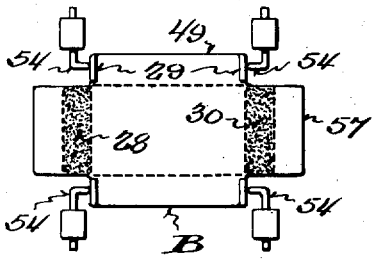
Figure 10:
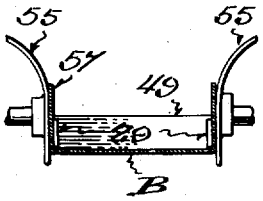
Figure 11:
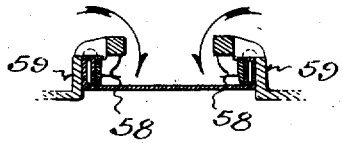
Figure 12:
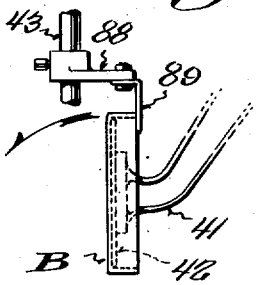

In the drawings, Figure 1 is a longitudinal sectional view through a machine construced in accordance with the present invention, the same being as indicated generally by line 1—1 of Figure 3; Figure 2 is a transverse fragmentary section taken on the line 2—2 of Figure 1; Figure 3 is a similar view taken on the line 3—3 of Figure 1, parts being broken back to more clearly illustrate other structural features; Figure 4 is a vertical fragmentary section through the gluing mechanism, the same being taken on the line 4—4 of Figure 1; Figure 5 is a detail section taken on the line 5—5 of Figure 2; Figure 6 is a fragmentary transverse section taken on the line 6—6 of Figure 1; Figure 7 is a plan view of a typical blank handled by the present machine; Figure 8 is a similar view of the tucking members for turning up the side tabs; Figure 9 is a diagrammatic view of the side folding plates; Figure 10 diagrammatically illustrates the manner of folding the ends of the box; Figure 11 is a similar view illustrating the gripping mechanism for turning over and securing the ends of the box; and Figure 12 is a fragmentary detail illustrating the means for discharging the completed boxes from the carrier.

Referring now more particularly to the accompanying drawings, a complete machine is illustrated for feeding individual blanks from a magazine or stack, gluing portions of the blank, and then conveying the same through mechanisms for progressively performing the operations necessary for completing the box. However, particular attention is directed to the fact that the salient features of the invention reside in the novel forming mechanisms and means for conveying the blanks therethrough. Therefore, the invention is not to be limited or restricted to the specific means disclosed for feeding or gluing the blanks, as this may be accomplished in other ways without departing from the spirit of the invention.

Considering now that form of the invention illustrated in the accompanying drawings, the numeral 1 designates generally a frame comprising the longitudinal side struts 2 connected by suitable transverse ends 3 supported upon legs 4.

For the purpose of explanation, that end of the machine into which the blanks are fed will be referred to as the front, and the opposite end the rear.

As best shown in Figures 1 and 6, a stack of blanks B, such as illustrated in Figure 7, are placed upon the parallel tracks 5, between suitable upright channels 6, which are carried by the transverse shafts 7 secured to side frames 8 mounted upon the longitudinal struts 2. Between the tracks 5 is a chain conveyor 9, which may be provided with one or more carriers 10 that pick up the lowermost blank supported between the tracks, and convey the same to a gluing mechanism G, the carriers 10 being provided with an overhanging tail 10', which engages the rear end of the blank to force the same along the tracks 5, after leaving the conveyor, to the position in which they are engaged by the carrier, as will be hereinafter described.

In order to feed one blank at a time from the bottom of the stack, a highly novel mechanism is provided for selecting and delivering the lowermost blank to the parallel tracks 5. This is accomplished by means of a plurality of spaced fingers 11, carried by a plate 12, which in turn is intermittently raised by means of a cam 13 that engages the roller 14 suitably connected with the plate 12. Cooperating with the fingers 11 are the suction cups 15, carried by a bracket 16 which is also intermittently raised and lowered by means of the cam 17, that engages the roller 18 connected with the bracket 16 by the stud 19.

Pivotally connected to the sides of the rear channel 6, as best shown in Figures 1 and 6, are a pair of arms 20, which are connected by a yoke 21 with the piston 22 of a suction cylinder 23 secured to the rear face of the channel, whereby desired oscillation of the arms 20 is obtained. Secured to the lower ends of the arms 20 is a divider blade 24, which, when projected under the stack of blanks B, serves to support the same above the tracks 5.

In order to deliver the lowermost blank to the tracks 5, whereby the same can be picked up by the conveyor 9, the cams 13 and 17 are timed to simultaneously raise the fingers 11 and the vacuum cups 15, respectively, after which the suction cylinder 23 operates to oscillate the arms 20 and withdraw the divider blade 24 from below the stack of blanks. The suction cups are then lowered by means of the cam 17, causing the lowermost blank to be bowed downwardly, as disclosed in Fig. 6, which permits sufficient clearance between the lowermost blank of the stack to allow entrance of the divider blade 24, after which the supporting fingers 11 are lowered through the operation of the cam 13, to permit the lowermost blank to drop upon the tracks 5. The suction in the cups 15 is then broken, and the blank is conveyed forwardly by the carrier 10, and delivered to a position above the glue pots 25, best shown in Figures 4 and 5.

The glue pots 25 are mounted on suitable brackets 26 carried by the side struts 2 of the frame 1, and are transversely adjustable to accommodate blanks of different dimensions. At the same time the tracks 5, which are carried by the glue pots 25, are also transversely adjusted, and in addition to such adjustment the tracks 5 may be further adjusted on the supporting angles 27, which serve to connect the tracks to the glue pots.

In that form of blank for which the present machine is designed, as illustrated in Figure 7, it is merely necessary to apply a coating of adhesive material 28 to the inner faces of the side tabs 29, and the folds 30 of the ends of the blank. This is accomplished by means of dippers 31, best shown in Figure 4, and comprising arms 32 vertically guided by the studs 33, which are slidably journaled in bosses carried by the glue pots 25. Carried by the arms 32 are the studs 34, which are connected to eccentrics 35 mounted upon the transverse shafts 36 and driven by sprockets 37 connected by chains with the main drive. The shafts 36 are journaled in the side frames, and also in a depending bracket 38 carried by the glue pots, and inasmuch as the shafts 36 are held against longitudinal movement with relation to the glue pots, the shafts and eccentrics 35 are simultaneously adjustable with the glue pots, it being merely necessary to release the sprockets 37 when the glue pots are transversely adjusted.

As best shown in Figure 4, the arms of the dippers 31 are provided with longitudinal plates 39, which, upon downward movement of the arms, are submerged in the adhesive contained in the glue pots, and upon being elevated they engage the bottoms of the blanks B, supported on the tracks 5, to impart a coating of adhesive material to portions of the blank, as indicated in Figure 7.

As heretofore explained, the feeding and gluing mechanisms described are considered preferable, due to their simplicity and efficiency, but it is to be understood that these may be varied without departing from the invention as pertains to the carrier and forming mechanisms about to be described.

Prior to applying the adhesive to the blanks B, as heretofore explained, the same are gripped by a rotatable carrier 40, which includes a plurality of radial arms 41, each of which is provided with a supporting plate 42 adapted to engage the blanks B as they rest on the tracks 5 above the glue pots 25. Pivotally connected to each arm 41 is a bell-crank lever 43, which carries a gripping plate 44, that cooperates with the supporting plate 42 of the adjacent arm, to firmly grip a blank and carry the same through the various forming mechanisms to be described. The bell-cranks 43 are actuated by an internal cam 45, which is journaled on a transverse shaft 46 to which the carrier 40 is secured. Aside from a limiting shifting actuation of the cam 45, the same is relatively stationary with respect to rotation of the carrier 40, and is merely shifted slightly at intermittent periods to effect a quick release and discharge of the finished containers from the supporting plates 42, as will be hereinafter described.

The cam 45 is so generated as to cause each gripper plate to engage a blank supported on the tracks 5 above the glue pots 25, after which the blank is carried through the forming mechanism, indicated generally as F and comprising arcuate front and rear plates 47 and 48, respectively, which serve to turn up the sides 49 of the blank (Figure 9). As best shown in Figure 1, the plates 47 and 48 are secured to the arms 50 and 51, respectively, which are carried by the brackets 52, longitudinally adjustable on the bed plates 53, in order to accommodate boxes of different widths.

At substantially the same time the side walls 49 are engaged by the plates 47 and 48, the end tabs are bent inwardly by the tuckers 54, which engage the tabs in the manner illustrated in Figure 8. The tuckers 54 are adjustably carried by the arms 50 and 51, which also carry the side folding plates 47 and 48. After the tabs 29 are tucked inwardly and the side walls 49 folded upwardly, the ends of the blank are engaged by the forming plates 55, which turn the ends upwardly in the manner disclosed in Figure 10. The plates 55 are also adjustably carried by brackets 56, mounted for longitudinal adjustment on the bed plates 53, similar to the brackets 52.

Next, the blank is carried to a horizontal position at the rear of the machine, in which the protruding ends 57 of the blank are turned inwardly over the tabs 29 to complete the formation of the box (Figure 11). This is accomplished by means of rotary grippers 58, positioned upon opposite sides of the carrier, and journaled in the heads 59, which carry the bed plates 53, and which are transversely adjustable on the vertical brackets 60, by means of hand wheels 61 secured to the shafts 62 journaled in the brackets 60, and having threaded engagement with the bosses 63 carried by the heads 59. The brackets 60 are vertically adjustable in the ways 64 on the main frame 1, whereby the grippers 58 may be adjusted both transversely and vertically to accommodate boxes of different depth and length. This is accomplished by the vertical shafts 90 revolubly connected with the brackets 60, and having threaded engagement in brackets 91 secured to the side frames 2. Hand-wheels 92 are provided for rotating the shafts 90.

For actuating the rotary grippers 58, their rear stub shafts 65 are provided with spur gears 66, which are engaged by oscillating sectors 67, pivotally carried by the heads 59. The sectors 67 are provided with integral arms 68, which carry the rollers 69 projecting into the horizontal slots 70 formed in a vertical reciprocative head 71. Obviously, as the head 71 reciprocates, oscillatory movement will be imparted to the sectors 67, which in turn actuate the grippers 58.

The reciprocative head 71 is connected to a bracket 72 by spaced rods 73, while the bracket is slidably mounted upon a guide 74 carried by the rear end 3 of the main frame 1, as best shown in Figure 1.

Reciprocative movement is imparted to the bracket 72, and the head 71, by means of an internal cam 75 mounted upon a shaft 78 journaled in a portion of the main frame, and which engages a roller 72′ carried by the bracket 72.

The drive for the various parts of the machine is taken off of the main transverse drive shaft 77 positioned at the rear of the machine, and connected with the cam shaft 77′ through the beveled gears 78.

The carrier shaft 46 is intermittently rotated by a conventional Geneva drive, including a star wheel 79 mounted on the stub shaft 80 carried by one of the side frame members 2, and, as best shown in Figure 5, the star wheel, which is of the locking type, is intermittently actuated by a pin 81 carried by a revolving arm mounted on the driven shaft 82, which is also journaled in the side frame 2. Formed integral with the arm 81 is a mutilated hub 83, which serves to lock the star wheel against movement intermediate its operations, in the usual manner. A suitable gear connection between the shaft 80 and the main carrier shaft 46, indicated in dotted lines in Figure 5, imparts intermittent rotary movement to the carrier.

Considering now the mechanism for discharging the boxes from the carrier, which operation takes place as each arm reaches its lowermost position, particular attention is directed to Figures 1 and 2, wherein it will be noted that the driven shaft 82 is also provided with a cam 84, which oscillates a bell-crank 85, the upper end of which is provided with a stud 86 engaging a forked arm 87 mounted upon a sleeve 45′ projecting from the cam 45. It will be apparent from the foregoing that actuation of the forked arm 87 will cause the cam 45 to oscillate through a limited arc, and inasmuch as the cam 45 controls the operation of the bell-crank levers 43, which effect gripping of the blanks on the carrier arms, shifting of the cam 45 necessarily effects operation of the levers 43.

However, were the cam 45 to remain stationary, actuation of the crank levers 45 would be gradual, and inasmuch as it is desired to effect a quick discharge of the completed boxes from the carrier arms, after they reach a predetermined position and are at rest, preferably at the bottom of their arc, the cam 45 is shifted in the manner described to cause the lowermost arm 43 to move quickly away from its cooperating supporting plate 42. This action not only releases the box, but positively strips the same from the supporting plate, in that each arm 43 has adjustably mounted thereon a bracket 88, which in turn carries an adjustable finger 89 normally positioned behind the adjacent supporting plate 42, as best shown in Figure 12. As the arm 43 is rotated outwardly, the finger 89 engages the upper edge of the box, and strips the same from the plate 42, discharging the box into a suitable receptace, or conveyor, not shown. Notches 42′ formed in the supporting plate 42 permit the fingers 89 to pass by the plates.

Drive is imparted to the shaft 82 through a gear, and chain and sprocket connection, with the main drive shaft 77, as indicated in dotted lines in Figure 1.

From the foregoing explanation, considered in connection with the accompanying drawings, it will be readily apparent that a comparatively simple and efficient box-forming machine has been provided, which is positive in its operation, and capable of maximum capacity, due to the various operations taking place not only progressively but simultaneously, as, for instance, gripping of the blank by the carrier, forming, and discharging the completed box, these operations being performed at various stations of the multiple carrier.

It is also to be understood that any number of radial carrier arms may be employed, as well as a plurality of carriers positioned side by side, without departing from the spirit of the invention.

While one form of box blank has been illustrated, it is to be understood that the present machine is capable of handling other types of blanks, such as a blank in which the end flaps 57 are eliminated. In that case, the grippers 58 would still function to clamp the ends of the blank and the tabs 29 into tight engagement while the adhesive is setting.

Attention is directed to the fact that the machine is completely adjustable within predetermined limits, thus rendering it capable of handling blanks of various dimensions, without necessitating replacement of parts, as generally required in conventional machines.

While it is considered that the operation of the machine may be fully understood from the explanation given, the same can be summed up briefly. The machine is loaded by placing a stack of blanks in the magazine formed by the vertical channels 6 and the tracks 5. The lowermost blank is then delivered to the tracks 5 by means of the divider blade 24 cooperating with the fingers 11 and the suction cups 15, in the manner described. The blanks are then carried along the track by the carriers 10 connected to the conveyor chain 9. As the conveyor chain leaves the tracks on its return stretch, the tails 10′ of the carriers 10 engage the edge of the blank and shove the same forward to a predetermined position over the glue pots. Operation of the dippers is so timed as to then apply a coating of adhesive to desired portions of the blanks, after which they are engaged between the supporting plates 42 and the gripping members 44 of the carrier. The carrier is then intermittently rotated one quarter of a circle, which carries the blanks through the forming mechanism F. The first operation is effected by the tuckers 54 and the front and rear forming plates 47 and 48, and results in turning in the tabs 29 and folding up the sides 49 of the blank. Following the foregoing operation, the ends of the box are engaged by the forming plates 55, and are thus bent upwardly against the tabs 29.

When the carrier reaches a horizontal position at the rear of the machine, its movement is stopped through operation of the star wheel, and while the carrier is located in this position, the grippers 58 are oscillated to fold over the protruding ends 57, and securely grip them into tight engagement with the tabs 29 and end folds 30 The carrier remains in this position until the adhesive has set, after which the grippers are rotated to their normal position. The carrier then continues its travel until the arm carrying the completed box reaches its lowermost position, at which point the box is released and discharged, as heretofore described.

Having thus explained the invention in considerable detail, it is understood that various changes are contemplated in structural and mechanical design, without departing from the spirit of the invention, the salient features of which reside in the novel feeding, gluing, carrying, forming, and discharging mechanisms.

What I claim is:

1. In a box-forming machine, a feeding mechanism, a magazine positioned above the feeding mechanism for receiving a stack of paper blanks, means for separating the lowermost blank from the stack and delivering the same to the feeding means, means for applying adhesive to portions of the blank, a rotary carrier for receiving said blanks, means for actuating the conveyor step-by-step, and means for engaging the blanks while on the carrier to form the same into completed boxes.

2. In a box-forming machine, a feeding mechanism, a magazine positioned above the feeding mechanism for receiving a stack of paper blanks, means for separating the lowermost blank from the stack and delivering the same to the feeding means, means for applying adhesive to portions of the blank, a rotary carrier for receiving said blanks, means for actuating the conveyor step-by-step, means for engaging the blanks while on the carrier to form the same into completed boxes, and means for stripping the completed boxes from the carrier.

3. In a box-forming machine, a rotary carrier for the blanks, means for imparting intermittent rotation to said carrier, forming means comprising stationary plates for engaging the sides and ends of the blank while on the carrier to fold the same upwardly from the bottom of the blank, and rotary grippers for engaging the ends of the blank to complete formation of the box.

4. In a box-forming machine, a rotary carrier for the box blanks, means for actuating the carrier step-by-step, means for gripping the blanks on the carrier, means for folding the blank while the carrier is in motion, and means on the carrier for stripping the formed boxes from the carrier while the latter is at rest.

5. In a box-forming machine, a rotary carrier for the box blanks, means for actuating the carrier step-by-step, means on the carrier for gripping the blanks thereto, means for performing various forming operations on the blank, means on the carrier for stripping the formed boxes therefrom, and mechanism for actuating the gripping and stripping means while the carrier is at rest.

6. In a box-forming machine, a rotary carrier for the box blanks, means for actuating the carrier step-by-step, means for gripping the blanks on the carrier, means for performing certain of the forming operations while the carrier is in motion and other forming operations while the carrier is at rest, and means on the carrier for stripping the boxes from the carrier.

7. In a box-forming machine, a rotary carrier for the blanks, means for imparting step-by-step rotation to the carrier, means for directly engaging and clamping the blanks on the carrier, means for stripping the formed box from the carrier, a cam normally stationary during movement of the carrier for causing the clamping means to hold the blanks on the carrier, and means for imparting intermittent oscillatory movement to the cam when the carrier is at rest to impart clamping and releasing movements to the clamping means and to cause the stripper to strip the formed box from the carrier.

8. In a box-forming machine, a rotary carrier having a plurality of blank supporting members, means for imparting step-by-step rotation to the carrier, grippers for engaging and clamping the blanks to the members, strippers for stripping the formed boxes from the carrier, and a cam for actuating both the grippers and the strippers when the carrier is at rest.

9. In a box-forming machine, a rotary carrier for the blanks, box-forming mechanism for folding the blank, means for rotating the carrier, a plurality of supports on the carrier for supporting the blanks, grippers movably mounted on the carrier for engaging and clamping the blanks to the supports, a normally stationary cam for actuating the grippers, and a second cam for imparting independent limited oscillatory movements to said first mentioned cam to impart clamping and releasing movements to the grippers.

10. In a box-forming machine, a rotary carrier for the blanks, means for imparting step-by-step rotation to the carrier, supports on the carrier for supporting a box blank, a gripper and stripper unit having gripping and stripping devices spaced from one another to receive the box blank therebetween, and means for moving the unit in one direction to cause the gripper to clamp a blank to the support and in the opposite direction to cause the gripper to release the formed box and the stripper to strip the same from the carrier.

11. In a box-forming machine, a rotary carrier comprising a plurality of arms each having a blank supporting plate, the plate being provided with a marginal slot, a bell-crank lever pivotally mounted on each arm, a gripper on the lever for clamping a blank to the supporting plate, a stripper mounted on the arm and arranged to pass through said marginal slot from one side of the supporting plate to the other for stripping the formed box from the carrier, means for actuating the bell-crank levers, and means for imparting rotary movement to the carrier.

12. In a box-forming machine, a main frame, a rotary carrier mounted thereon, means for clamping box blanks to the carrier, mechanism for rotating the carrier to present the blanks to the box-forming devices, supports on the frame adjustable in a direction normal to the plane of rotation of the carrier, and fixed turning devices independently adjustable on the supports for forming the side and end portions of varying sizes of box blanks.

13. In a box-forming machine, a main frame, a rotary carrier mounted thereon, means for clamping box blanks to the carrier, mechanism for rotating the carrier to present the blanks to the box-forming devices, vertically adjustable members carried by the frame, supports carried by the members and adjustable in a direction normal to the plane of rotation of the carrier, blank forming devices comprising normally fixed turning devices adjustable on the supports for turning the sides and ends of varying sizes of box blanks, and supplementary movable turning devices mounted on said supports for performing a supplementary turning operation on the ends of the blanks.

14. In a box-forming machine, a rotary carrier for the box blanks, means for actuating the carrier step-by-step, means for performing forming operations on the blank including devices for turning in the ends of the blank, means for imparting rotary movements to said devices comprising intermeshing toothed members, one of said members benig rigidly connected to one of said devices, a pivoted arm for actuating the other of said members, a slotted head for actuating the arm, and means for reciprocating the head.

15. In a box-forming machine, a main frame, a rotary carrier for the box blanks, means for actuating the carrier, a vertically adjustable head on the frame, a support carried by the head and adjustable thereon in a direction normal to the plane of rotation of the carrier, devices mounted on the support for turning in the end of the box blank, a slotted member, means for imparting reciprocatory movements to said member, and means positioned in the slot and connected to one of said devices for actuating the same.

16. In a box-forming machine, a rotary carrier for the blanks, means for imparting intermittent rotation to the carrier, forming means comprising stationary devices for engaging the sides and ends of the blank while on the carrier to fold the same upwardly from the bottom of the blank when the carrier is in motion, and movable means for engaging and turning the ends of the blank to fold the same inwardly toward the bottom of the blank when the carrier is at rest.

MARSHALL A. WATERS.